Patented Aug. 22, 1933

1,923,248

UNITED STATES PATENT OFFICE 1,923,248

PROCESS FOR MAKING 6-BROMO-2-HYDROXY - NAPHTHALENE - 3 - CARBOXYLIC ACID

Arthur Zitscher, Offenbach-on-the-Main, Germany, assignor to General Aniline Works, Inc., New York, N. Y., a Corporation of Delaware No Drawing. Application December 14, 1931, Serial No. 581,080, and in Germany December 15, 1930

1 Claim. (Cl. 260—110)

This invention relates to an improved process of making 6-bromo-2-hydroxy-naphthalene-3-carboxylic acid.

The production of 6-bromo-2-naphthol by the action of tin salts in an alcoholic solution on 1.6-dibromo-2-naphthol has been described by Franzen and Stäuble in " Journal für praktische Chemie" (new series), vol. 103 (1921–22), page 369. It is indicated in the German Specification No. 396,519, lines 46 to 50, that 6-halogen-2-hydroxy-3-naphthoic acids may be prepared in a manner analogous to that manufacture.

United States application Serial No. 571,276 of 1931 now Patent No. 1,890,711 of December 13, 1932 describes the manufacture of 6-bromo-2-hydroxy-naphthalene-3-carboxylic acid by heating an alkali metal salt of 1.6-dibromo-2-hydroxy-naphthalene-3-carboxylic acid with an alkali metal sulfite.

According to the present invention the removal of the bromine atom standing in the 1-position may be effected also by means of glucose in an alkaline medium.

In order to further illustrate my invention the following example is given, the parts being by weight and all temperatures in centigrade degrees, but I wish it however to be understood, that my invention is not limited to the particular products or reaction conditions mentioned therein:

Example 100 parts of 1.6-dibromo-2-hydroxy-naphthalene-3-carboxylic acid are suspended in 750 parts of water, the mass is mixed with 125 parts of glucose and heated to boiling. Then 240 parts of caustic soda lye of 36° Bé are allowed to run into the mixture. Thereby a red solution is formed which is heated to boiling under a reflux condenser for about further 8 hours. By acidifying the cooled reaction mass 6-bromo-2-hydroxy-naphthalene-3-carboxylic acid is precipitated.

I claim:

Process which comprises heating 1.6-dibromo-2-hydroxy-naphthalene-3-carboxylic acid in an alkaline medium with glucose.

ARTHUR ZITSCHER.